(12) United States Patent
Tamura

(10) Patent No.: US 8,503,349 B2
(45) Date of Patent: Aug. 6, 2013

(54) WIRELESS LAN RELAY APPARATUS

(75) Inventor: Yoshiteru Tamura, Nagoya (JP)

(73) Assignee: Buffalo Inc., Nagoya-shi (JP)

(*) Notice: Subject to any disclaimer, the term of this patent is extended or adjusted under 35 U.S.C. 154(b) by 894 days.

(21) Appl. No.: 12/539,396

(22) Filed: Aug. 11, 2009

(65) Prior Publication Data

US 2010/0046417 A1 Feb. 25, 2010

(30) Foreign Application Priority Data

Aug. 19, 2008 (JP) .................................. 2008-210563

(51) Int. Cl.
*H04B 7/14* (2006.01)
*G06F 15/16* (2006.01)
*G06F 15/173* (2006.01)

(52) U.S. Cl.
USPC .......................... 370/315; 709/232; 709/238

(58) Field of Classification Search
USPC .......................... 370/315–327; 709/238–244
See application file for complete search history.

(56) References Cited

U.S. PATENT DOCUMENTS

| 7,532,624 | B2* | 5/2009 | Ikegami et al. | 370/390 |
| 8,000,657 | B2* | 8/2011 | Do et al. | 455/67.13 |
| 2007/0064643 | A1* | 3/2007 | Tavares | 370/328 |
| 2009/0161600 | A1 | 6/2009 | Sato et al. | |

FOREIGN PATENT DOCUMENTS

| CN | 1973496 | 5/2007 |
| JP | 2006-261831 | 9/2006 |
| JP | 2007-74564 | 3/2007 |
| JP | 2007-89151 | 4/2007 |
| JP | 2007-151048 | 6/2007 |
| JP | 2007-295541 | 11/2007 |
| JP | 2008-66827 | 3/2008 |
| JP | 2008-210563 | 8/2008 |
| WO | WO 2005/125113 | 12/2005 |
| WO | WO2005125113 | * 12/2005 |
| WO | WO 2007/080773 | 7/2007 |

OTHER PUBLICATIONS

Machine Translation of WO2005125113, Mar. 21, 2012.*
Notification of Reason for Rejection dated Jun. 22, 2010 from Japanese Application No. 2008-210563.
Notification of Reason for Rejection dated Sep. 14, 2010 from Japanese Patent Application No. 2008-210563.
Chinese Office Action dated Nov. 23, 2011 from Chinese Application No. 200910167210.9.

* cited by examiner

*Primary Examiner* — Afshawn Towfighi
(74) *Attorney, Agent, or Firm* — Beyer Law Group LLP

(57) ABSTRACT

The relay apparatus includes a wireless communication unit configured to carry out wireless communication with the base station, and capable of direct wireless communications respectively with other relay apparatuses belonging to the wireless LAN, without going through the base station, and a path search unit configured to compare the throughput of a wireless communication path for carrying out data transfer to a destination apparatus without going through the base station, with the throughput of a wireless communication path for carrying out data transfer to a destination apparatus going through the base station; and select the path having higher throughput.

5 Claims, 12 Drawing Sheets

GROUP REPORT GR SENT BY RELAY APPARATUS 20

| | | |
|---|---|---|
| GRM | HOME DEVICE MAC ADDRESS | EC20 |
| | BSSID OF CONNECTED BASE STATION | AP10 |
| GRS | SECURITY FUNCTION | AES |
| | ⋮ | ⋮ |

Fig.7

GROUP TABLE 222 IN RELAY APPARATUS 30

| REGISTRATION NO. (GTN) | MAC ADDRESS (GTM) | SECURITY INFORMATION (GTS) |
|---|---|---|
| 001 | EC40 | WEP |
| 002 | EC50 | TKIP/WEP |
| 003 | EC20 | AES/TKIP/WEP |

Fig.8

LINK RATE REPORT LR SENT BY RELAY APPARATUS 20

| | | |
|---|---|---|
| LRM | HOME DEVICE MAC ADDRESS | EC20 |
| LRA | LINK RATE TO CONNECTED BASE STATION | 11 (Mbps) |
| LRR | LINK RATE TO RELAY APPARATUS 30 | 24 (Mbps) |
| | LINK RATE TO RELAY APPARATUS 40 | 1 (Mbps) |
| | LINK RATE TO RELAY APPARATUS 50 | 0 |
| LRS | MAC ADDRESS OF TERMINAL APPARATUSES CONNECTED TO HOME DEVICE | { STA21 , STA22 } |

Fig.9
LINK RATE TABLE 224 IN RELAY APPARATUS 20

| ACCESS POINT MAC ADDRESS (LTC) | LINK RATE TO ACCESS POINT (Mbps) (LTR) | LINK RATE TO BASE STATION (Mbps) (LTA) | MAC ADDRESS LIST (LTS) |
|---|---|---|---|
| EC30 | 24 | 5 | [STA31, STA32, STA33] |
| EC40 | 1 | 36 | [STA41, STA42] |
| EC50 | 10 | 24 | [STA51, STA52] |
| AP10 | 11 | N/A | N/A |

Fig.14

LINK RATE TABLE 224 IN RELAY APPARATUS

| LTC<br>ACCESS POINT<br>MAC ADDRESS | LTR<br>LINK RATE TO<br>ACCESS POINT (Mbps) | LTA<br>LINK RATE TO<br>BASE STATION (Mbps) | LTS<br>MAC ADDRESS LIST |
|---|---|---|---|
| EC30 | 24 | 5 | {STA31, STA32, STA33} |
| EC40 | 1 | 36 | {STA41, STA42} |
| EC50 | 10 | 24 | {STA51, STA52} |
| EC60 | 8 | 32 | {STA61, EC120, EC130, EC140, EC150, EC160, STA121, STA122, STA161, STA162} |
| AP10 | 11 | N/A | N/A |

E101    E102    E103

WIRELESS LAN RELAY APPARATUS

CROSS-REFERENCE TO RELATED APPLICATIONS

The present application claims the priority based on Japanese Patent Application No. 2008-210563 filed on Aug. 19, 2008, the disclosure of which is hereby incorporated by reference in its entirety.

BACKGROUND OF THE INVENTION

1. Field of the Invention

The present invention relates to wireless communications technology that utilizes a wireless local area network (wireless LAN).

2. Description of the Related Art

In a wireless LAN based on IEEE 802.11 standards, data being transferred from a given wireless LAN relay apparatus to another wireless LAN relay apparatus must do so via a wireless LAN base station. A resultant problem is that of poor efficiency, due to the fact that given data must travel in two hops between wireless segments. While the 802.11e and 802.11z subsets of IEEE 802.11 provide more advanced standardization for direct communication among terminals, these protocols have not yet been put to actual use. Given this background, there exists a need to reduce redundancies in relaying of data, so that data communications can take place with better efficiency. To address this issue, JP-A 2007-295541 discloses a technology whereby a terminal employs a first wireless channel used for wireless communication with a base station, and a second wireless channel different from the first wireless channel, used for the purpose of direct inter-terminal communication, that is communication that does not go through a base station, with another terminal.

However, this technology has the drawback that it is necessary to separate the wireless channels being used.

SUMMARY

An object of the present invention is to provide technology that makes possible efficient data communications, without the requirement of having to separate the wireless channels being used.

According to an aspect of the present invention, a relay apparatus is provided. The relay apparatus capable of relaying data transfer between a terminal apparatus and a wireless LAN base station through a wireless LAN, comprises: a wireless communication unit configured to carry out wireless communication with the base station, and capable of direct wireless communications respectively with other relay apparatuses belonging to the wireless LAN, without going through the base station; and a path search unit configured to compare the throughput of a wireless communication path for carrying out data transfer to a destination apparatus without going through the base station, with the throughput of a wireless communication path for carrying out data transfer to a destination apparatus going through the base station; and select the path having higher throughput.

According to this configuration, a data transfer path that does not go through a wireless LAN base station can be selected, thereby affording a greater number of alternative data transfer paths. With regard to the plurality of data transfer paths, because a path with high data transfer throughput can be selected, more efficient data communications are possible.

There are any number of possible modes for carrying out the invention. Such possible modes include, for example, a wireless LAN relay apparatus and method; a recording medium having recorded thereon a computer program for accomplishing the functions of such a method or device, or the like.

BRIEF DESCRIPTION OF THE DRAWINGS

FIG. 7 is an illustration depicting an example of a group table in the relay apparatus, after a group report GR has been received from the relay apparatus;

FIG. 8 is an illustration depicting an example of a link rate report LR sent to other relay apparatuses by the relay apparatus;

FIG. 9 is an illustration depicting an example of the link rate table in the relay apparatus;

FIG. 14 is an illustration depicting an example of the link rate table in the relay apparatus of Embodiment 3.

DESCRIPTION OF THE PREFERRED EMBODIMENT

Next, aspects of the present invention will be described in the following order on the basis of embodiments:
A. First Embodiment
B. Second Embodiment
C. Third Embodiment
D. Modifications:

A. First Embodiment

Figure 1:
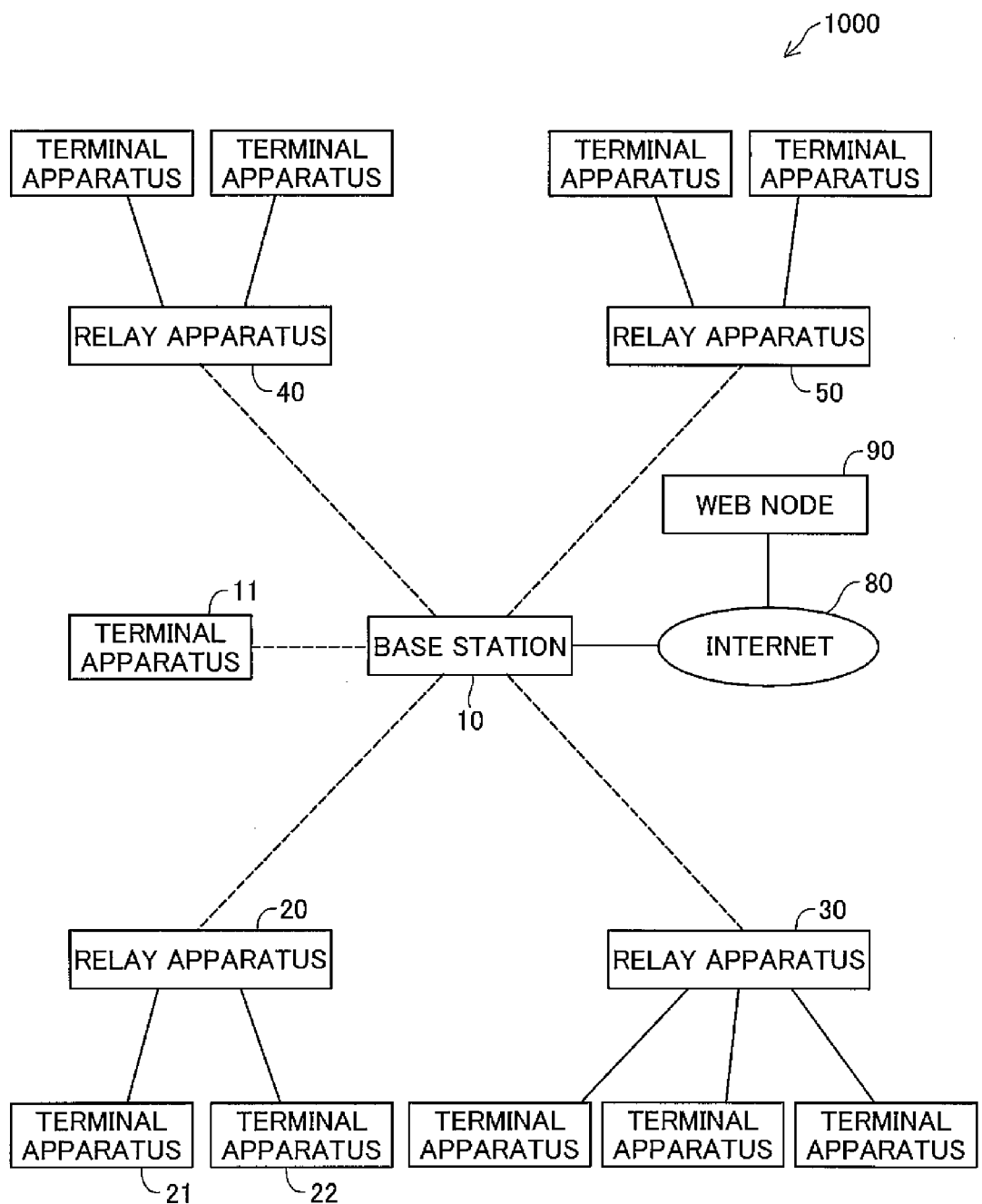
FIG. 1 is an illustration depicting as one embodiment of the present invention a simplified configuration of a network in which wireless LAN relay apparatuses are used.

FIG. 1 is an illustration depicting as one embodiment of the present invention a simplified configuration of a network in which wireless LAN relay apparatuses are used. This network 1000 has a wireless LAN base station 10, a terminal apparatus 11, and four wireless LAN relay apparatuses 20 to 50 (herein, these wireless LAN apparatuses shall be termed simply "relay apparatuses"). The base station 10, the relay apparatuses 20 to 50, and the terminal apparatus 11 are wireless LAN communication apparatuses compliant with IEEE 802.11 standards.

The base station 10 is a wireless LAN base station, also known as a wireless LAN access point. The base station 10 establishes a wireless LAN that is compliant with IEEE 802.11 standards. In the present embodiment, the terminal apparatus 11 and the relay apparatuses 20 to 50 connect to the wireless LAN which has been established by the base station 10. The relay apparatuses 20 to 50 and the terminal apparatus 11 belonging to the wireless LAN established by the base station 10 make up a single group called a BSS (Basic Service Set). The base station 10 is also equipped with routing functionality for connecting the wireless LAN to an external network, in this case the Internet 80. This routing functionality enables, for example, data communication between a terminal apparatus 21 connected to the relay apparatus 20, and a web node 90 (for example a personal computer, a web server, or a mail server). The routing functionality of the base station 10 is not limited to Internet 80 connectivity, and may include connectivity to other wide area networks or to other LANs. The terminal apparatus 11 is a client terminal (for example a personal computer) that connects to the base station 10 through the wireless LAN.

The relay apparatus 20 is a wireless LAN relay apparatus also known as a wireless LAN ETHERNET converter (ETHERNET is a registered trademark). The relay apparatus 20 has a wired LAN interface. One or more terminal apparatuses may connect to this wired LAN interface. By so doing, it is possible for a terminal apparatus having only a wired LAN interface to be connected to the wireless LAN. The relay apparatus 20 of the present embodiment has an on-board switching hub, thus enabling connection of several terminal apparatuses (terminal apparatuses 21, 22). The terminal apparatuses 21, 22 are client devices (for example, digital consumer electronic devices or network-compatible home video game machines) that connect to the relay apparatus 20 through the wired LAN.

Figure 2:
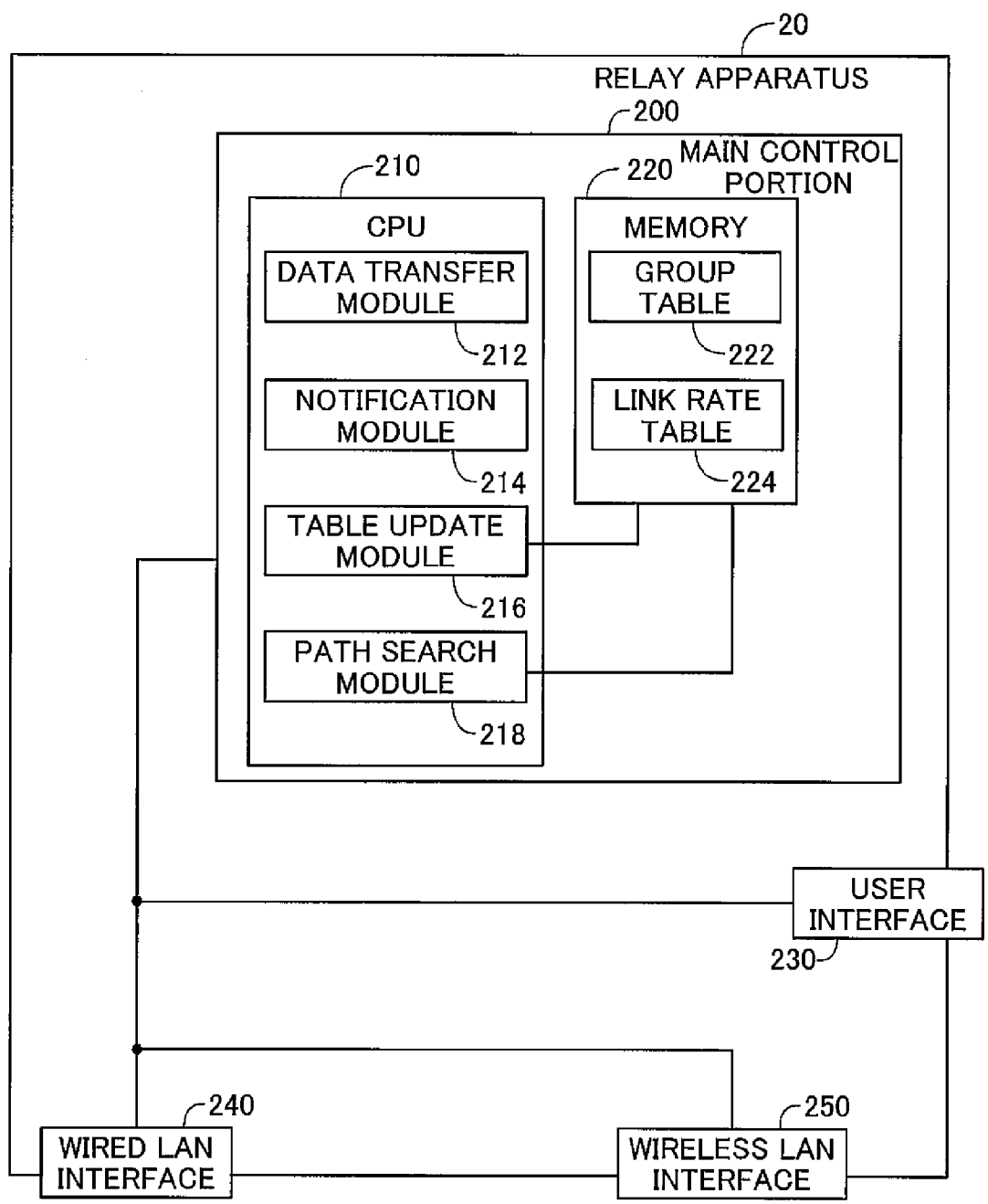
FIG. 2 is an illustration depicting a simplified configuration of a relay apparatus.

FIG. 2 is an illustration depicting a simplified configuration of a relay apparatus. The relay apparatus 20 is furnished with a main control portion 200, a user interface 230, a wired LAN interface 240, and a wireless LAN interface 250.

The main control portion 200 has a CPU 210 and a memory 220, and is adapted to control the various parts of the relay apparatus 20. In the present embodiment, the CPU 210 of the main control portion 200 carries out the software-based functions of a data transfer module 212, a notification module 214, a table update module 216, and a path search module 218. The data transfer module 212, together with the wireless LAN interface 250, functions as a wireless communication section for carrying out communications with the base station 10 and with other relay apparatuses. The notification module 214 functions to notify relay apparatuses of group reports GR and link reports LR. On the basis of group report GR and link report LR notifications provided by the notification module 214, the table update module 216 updates a group table 222 and a link rate table 224 that are held in memory. The path search module 218 will select a data transfer path on the basis of the link rate table 224. The group table 222 is a table for storing nodes of the other relay apparatuses within the same BSS. The link rate table 224 is a table for storing data transfer speeds (hereinafter termed "link rates" or "throughput") to other relay apparatuses within the same BSS and to the base station to which these belong. These modules and tables will be discussed in detail later.

The user interface 230 includes indicator lamps and input buttons for the purpose of enabling the user to directly perform various settings of the relay apparatus 20. The wired LAN interface 240 is an interface for carrying out data communications with the IEEE 802.3 compliant wired LAN. The terminal apparatuses 21, 22 (FIG. 1) are connected via this wired LAN interface 240. The wireless LAN interface 250 is an interface for carrying out data communications with the IEEE 802.11 compliant wireless LAN. The relay apparatus 20 communicates with the base station 10 and with the wireless LAN via this wireless LAN interface 250. In the present embodiment, the standard for the wireless LAN interface 250 could be either IEEE 802.11a, b, or g; alternatively some standard other than IEEE 802.11 could be used.

Figures 3, 4:
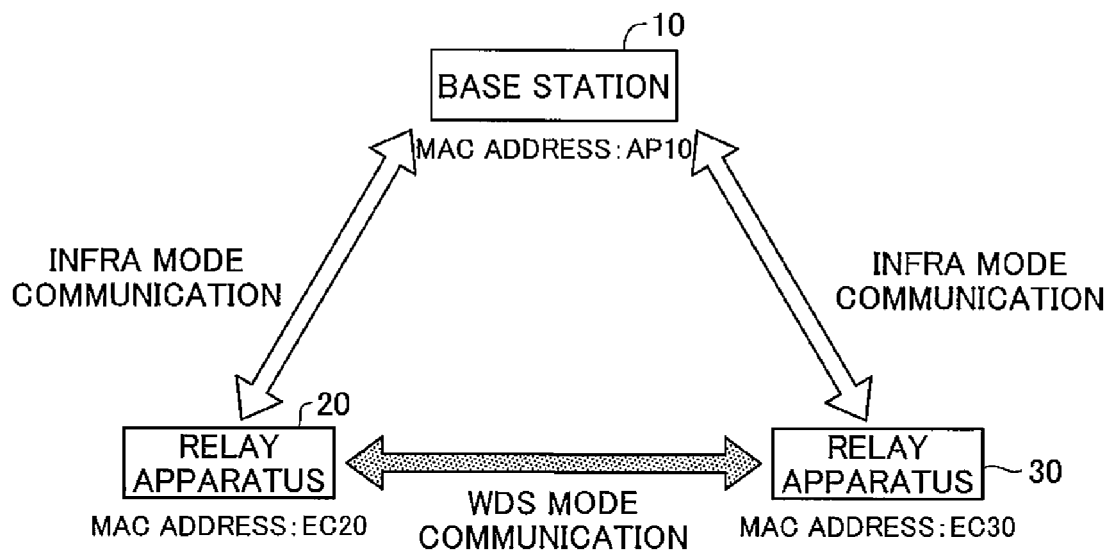
FIG. 3 is an illustration depicting communications frameworks for relay apparatuses.
FIG. 4 is an illustration depicting an example of a group report GR that is sent to another relay apparatus by the relay apparatus.

FIG. 3 is an illustration depicting communications frameworks for relay apparatuses. In FIG. 3, AP10 denotes the MAC address of the base station 10; EC20 denotes the MAC address of the relay apparatus 20; and EC30 denotes the MAC address of the relay apparatus 30. If the relay apparatus 20 is to communicate with the base station 10, a communications framework that employs infrastructure mode (hereinafter also referred to as "infra mode") will be used (hereinafter this will also referred to as "infra mode communication"). Specifically, after completing authentication in accordance with infra mode, the relay apparatus 20 will set up a logical link relationship (association) with the base station 10. Once the link relationship has been set up, it will be possible for the relay apparatus 20, via the base station 10, to communicate data to the relay apparatus 30 and to the web node 90 on the Internet 80. On the other hand, if communication is to take place between relay apparatuses without going through the base station 10, a communications framework that employs WDS (Wireless Distribution System) mode will be used (hereinafter this will also referred to as "WDS mode communication"). Specifically, the relay apparatus 20 will send a packet to the other relay apparatus 30 using a data frame compliant with the WDS mode. Upon receipt of the packet from the relay apparatus 20, the relay apparatus 30 will carry out authentication based on MAC address. If the MAC address of the relay apparatus 20 (EC20) is a MAC address that has been authorized by the relay apparatus 30, the relay apparatus 30 will relay the packet in question. This authentication process through MAC address will be carried out on the basis of MAC address information of the relay apparatus 20 that is stored in a "transfer source base station MAC address" field in the MAC frame. In the present embodiment, WDS mode communication differs from infra mode communication in that association setup is not performed.

FIG. 4 is an illustration depicting an example of a group report GR that is sent to another relay apparatus by the relay apparatus 20. The group report GR includes the MAC address GRM of the home device (the relay apparatus 20: the relay apparatus which is the sender of the group report); the BSSID (Basic Service Set Identifier) of the currently connected base station 10; and a security function GRS. The home device (the relay apparatus 20) MAC address GRM stores the MAC address EC20 of the relay apparatus 20, which is the sender of the group report GR. The BSSID stores the MAC address AP10 of the base station 10. The security function GRS stores a symbol representing a security function of the relay apparatus 20, which is the sender of the group report GR. The security function GRS will indicate a function of encryption type, for example, WEP, TKIP, AES or the like. The group report GR entries shown here are merely exemplary, and additional entries could be provided. Such additional entries could include, for example, information indicating a master/slave relationship between relay apparatuses; or a time interval ΔT1 to be used during notification of the various reports (the group reports GR and the link rate reports LR).

Figure 5:
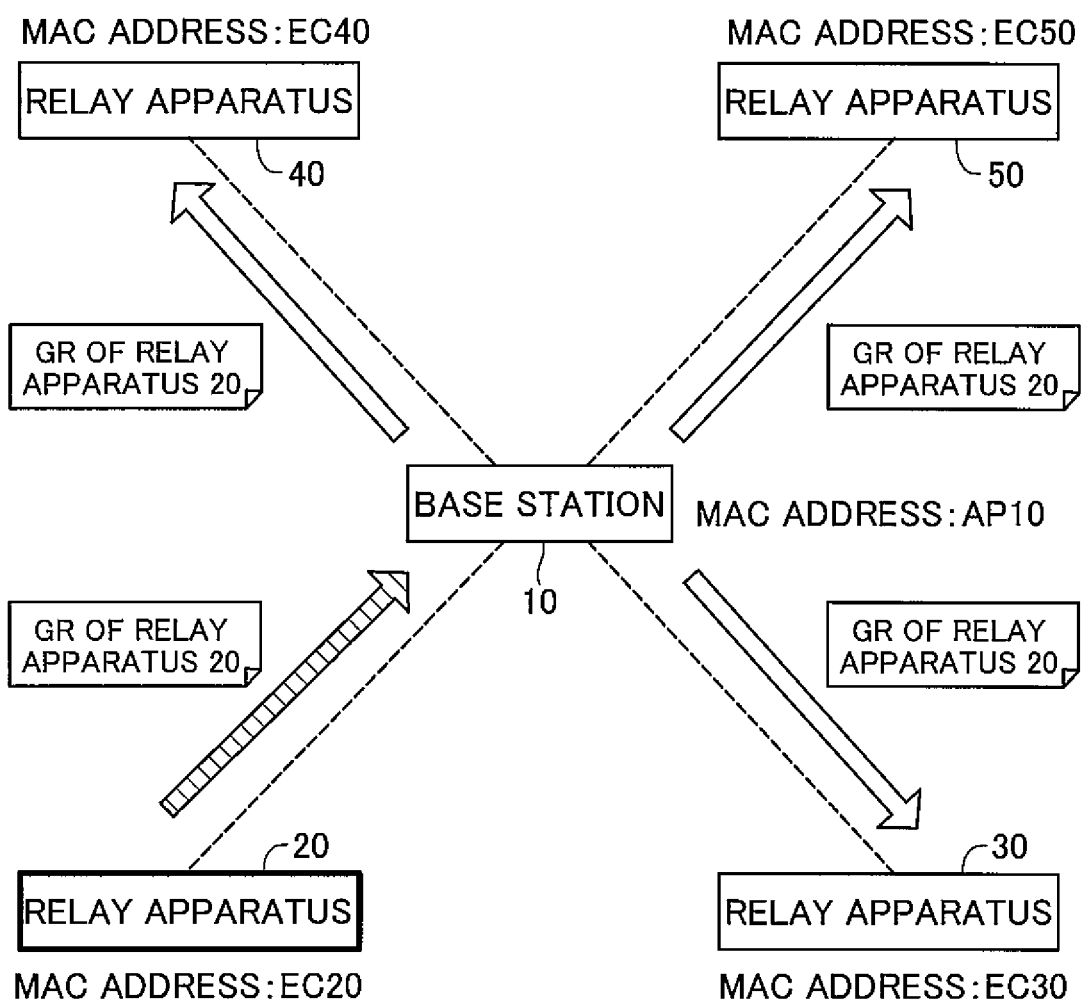
FIG. 5 is an illustration depicting group report GR notification of other relay apparatuses by the relay apparatus.

FIG. 5 is an illustration depicting group report GR notification of other relay apparatuses by the relay apparatus 20. This group report GR is broadcasted by the notification module 214 in the relay apparatus 20. Specifically, the notification module 214 of the relay apparatus 20 will send the group report GR of its home device (the relay apparatus 20) to the base station 10. Upon receiving the group report GR from the relay apparatus 20, the base station 10 will forward the group report GR from the relay apparatus 20 to all of the relay apparatuses 30, 40, 50, except for the sender relay apparatus. As the protocol used this broadcast, it would be possible to employ UDP for example. It would also be possible to employ multicasting instead of broadcasting. In preferred practice the group report GR will be sent at timing coincident with the relay apparatus 20 being connected to the base station 10; however, any timing for sending the group report GR would be possible instead. Through this group report GR, the other relay apparatuses which are connected to the base station 10 can be notified inter alia of the MAC address of the home device (the relay apparatus which is the sender of the group report). From the standpoint of preventing loop situations, it is preferable that data transmission among relay apparatuses not take place during broadcasting.

Figure 6:
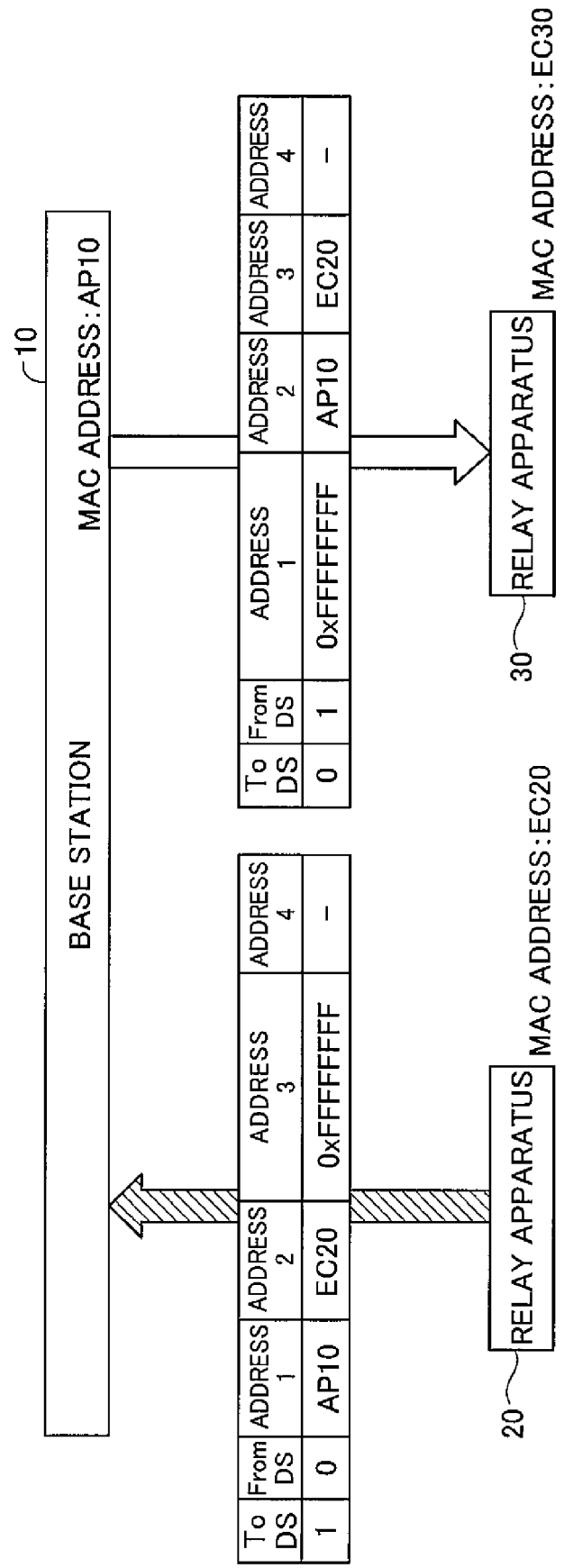
FIG. 6 is an illustration depicting in model form data frames that are exchanged among the base station and the relay apparatuses in FIG. 5.

FIG. 6 is an illustration depicting in model form data frames that are exchanged among the base station 10 and the relay apparatuses 20, 30 in FIG. 5. To simplify the description, the relay apparatuses 40, 50 that appear in FIG. 5 are omitted in FIG. 6. In FIG. 6, a "To DS" (Distribution System) field, a "From DS" field, and an "Address" field are shown in each data frame. If the To DS field in the data frame is "1", this indicates that the receiving station is a base station; whereas if it is "0", this indicates that the receiving station is a terminal station (in the present embodiment, a relay apparatus). If the From DS field in the data frame is "1", this indicates that the sending station is a base station; whereas if it is "0" this indicates that the sending station is a terminal station (in the present embodiment, a relay apparatus).

Where a group report GR has been broadcast by the relay apparatus 20, in the infra mode data frame sent from the relay apparatus 20 to the base station 10, a "1" will be stored in the To DS field and a "0" in the From DS field. In the Address field of the data frame, the MAC address "AP10" of the base station 10, which is the receiving station, will be stored at Address 1. Analogously, the MAC address "EC20" of the relay apparatus 20, which is the sending station, will be stored at Address 2; and a broadcast address "0xFFFFFFFF" indicating the destination will be stored at Address 3.

Having received the group report GR from the relay apparatus, the base station 10 will now send the group report GR of the relay apparatus 20 to the relay apparatuses 30 to 50, apart from the relay apparatus 20 connected to itself. For example, in this instance, in the infra mode data frame that is sent from the base station 10 to the relay apparatus 30, a "0" will be stored in the To DS field and a "1" will be stored in the From DS field. In the Address field of this data frame, the broadcast address "0xFFFFFFFF" will be stored at Address 1. Analogously, the MAC address "AP10" of the base station 10, which is the sending station, will be stored at Address 2; and the MAC address "EC20" of the relay apparatus 20, which was the original sender, will be stored at Address 3. In the present embodiment, the specific apparatus that initially sends a group report GR is termed the "sender". On the other hand, a "sending station" is a base station or relay apparatus that sends a data frame.

FIG. 7 is an illustration depicting an example of a group table 222 in the relay apparatus 30, after a group report GR has been received from the relay apparatus 20. The group table 222 contains entries for registration number GTN, entries for MAC address GTM, and security information GTS. The entries for registration number entries GTN contain numbers that are uniquely identifiable within the group table 222. The entries for MAC address GTM contain the MAC addresses of other relay apparatuses that also connect to the base station to which the home device (the relay apparatus 30) is connected. The security information GTS contains symbols indicating the security function of the other relay apparatuses in question. The table update module 216 will update the group table 222 when triggered by receipt of a group report GR from another relay apparatus. In preferred practice, these updates will be carried out each time that a group report GR is received.

Through exchange of group reports GR among relay apparatuses and storing of the information in tables in this way, all of the relay apparatuses will be able to ascertain information (such as MAC address for example) of other relay apparatuses that belong to the same wireless LAN. As a result, it will be possible for the relay apparatuses to communicate with one another without going through a base station.

FIG. 8 is an illustration depicting an example of a link rate report LR sent to other relay apparatuses by the relay apparatus 20. The link rate report LR contains the MAC address LRM of the home device (the relay apparatus 20: the relay apparatus which is the sender of the link rate report); the link rate LRA to the connected base station; entries for link rates LRR to other relay apparatuses; and a MAC address list LRS of terminal apparatuses connected to the home device (the relay apparatus 20). The entry for link rate LRA to the connected base station contains the link rate from the relay apparatus 20, that is the sender of the link rate report LR, to the base station 10 to which the home device (the relay apparatus 20) is connected. In the example of FIG. 8, the link rate LRA from the relay apparatus 20 to the base station 10 is 11 Mbps.

In the present embodiment, the link rate may be calculated in the following way, for example. To calculate the link rate from Terminal A to Terminal B, Terminal A will send a NULL frame to Terminal B. If Terminal B has received the frame normally, an ACK (acknowledge signal) will be returned from Terminal B to Terminal A. Terminal A will employ the NULL frame transmission link rate at the time that the ACK frame is returned after the NULL frame has been sent. In preferred practice, this link rate calculation will be performed periodically at prescribed intervals, in order to improve the reliability of the link rate report LR.

In the example of FIG. 8, the link rate LRR from the relay apparatus 20 to the relay apparatus 30 is 24 Mbps. The link rate LRR from the relay apparatus 20 to the relay apparatus 340 is 1 Mbps. The link rate LRR from the relay apparatus 20 to the relay apparatus 50 is 0. This "0" is a value that is stored in the event that the link rate between relay apparatuses cannot be calculated (for example in the event that no ACK frame was returned). However, some other value besides "0" could be employed as the value that is stored in instances where link rate cannot be calculated. The link report LR entries shown here are merely exemplary, and additional entries could be provided. Other possible entries are, for example, a symbol indicating a security function; or priority information for indicating a master/slave relationship between relay apparatuses. Also, the group report GR and the link report LR may be consolidated into a single report. Any of various methods could be employed for determining master/slave relationships. For example, the relay apparatus having the most recent MAC address could be designated as the master, with the remaining apparatuses designated as slaves. In another example, priority information could be entered by the user.

The link report LR will be broadcasted by the notification module 214 in the relay apparatus 20. The transmission method is the same as that described in FIGS. 5 and 6. The timing at which the link report LR is sent is arbitrary. However, in preferred practice, the report will be sent periodically, so as to improve the reliability of path search processes based on the link rate table 224. Also, the interval at which the link report LR is transmitted will preferably be uniform across relay apparatuses. For example, a link report LR transmission time interval ΔT1 could be included in the group report GR that is sent by the relay apparatus functioning as the master. The slave relay apparatuses would then transmit link reports LR at this time interval ΔT1. Master/slave relationships can be determined on the basis of priority information in the group report GR.

FIG. 9 is an illustration depicting an example of the link rate table 224 in the relay apparatus 20. The link rate table 224 contains entries for access points LTC, entries for link rate LTR to access points, entries for link rate LTA to base station, and a MAC address list LTS. The entries for access points LTC contain information for the purpose of identifying nodes accessible by direct wireless communication from the home device (the relay apparatus 20). FIG. 9 depicts an example in which MAC address is used as this identifying information. However, this information is not limited to information enabling specification of nodes, and any other information could be used instead. The entries for link rate LTR to access points contain, for each access point LTC, the link rate in the event of direct communication from the home device (the relay apparatus 20) to the access point LTC. For example, field E1 of FIG. 9 indicates that the link rate from the relay apparatus 20 to the relay apparatus 30 is 24 Mbps. The entries for link rate LTA to base station contain, for each access point LTC, the link rate from the access point LTC to the base station 10. For example, field E2 of FIG. 9 indicates that the link rate from the relay apparatus 30 to the base station 10 is 5 Mbps. The MAC address list LTS contains MAC addresses of terminal apparatuses that are connected to each access point LTC. For example, field E3 of FIG. 9 indicates that three terminal apparatuses having MAC addresses "STA31", "STA32", and "STA33" are connected to the relay apparatus 30. In FIG. 9, "N/A" indicates that the information is question is not available.

The table update module 216 will update the link rate table 224 when triggered to do so by receipt of a link report LR from another relay apparatus. In preferred practice, this updating will take place each time that a link report LR is received. In the event that the table update module 216 fails to receive a link report LR from a specific relay apparatus for a given time interval, it will update the link rate table 224 to a state whereby paths routed through the relay apparatus in question are deselected. Specifically, let it be assumed that the relay apparatus 20 fails to receive a link rate report LR from the relay apparatus 50 for a given time interval ΔT2. At this point, the table update module 216 will extract the data for the relay apparatus 50 (that is the data indicating that the access point LTC field is EC50) from the link rate table 224, and delete the data. In order to place a path in the deselected state, besides deleting the data, it would also be acceptable to enter a specific null value (for example "0"). Any value can be employed as the time interval ΔT2 value. For example, the value of time ΔT2 could be equal to ΔT1/2. This value ΔT1 represents the time interval for notification of the various reports (the group report GR and the link rate report LR).

Figure 10:
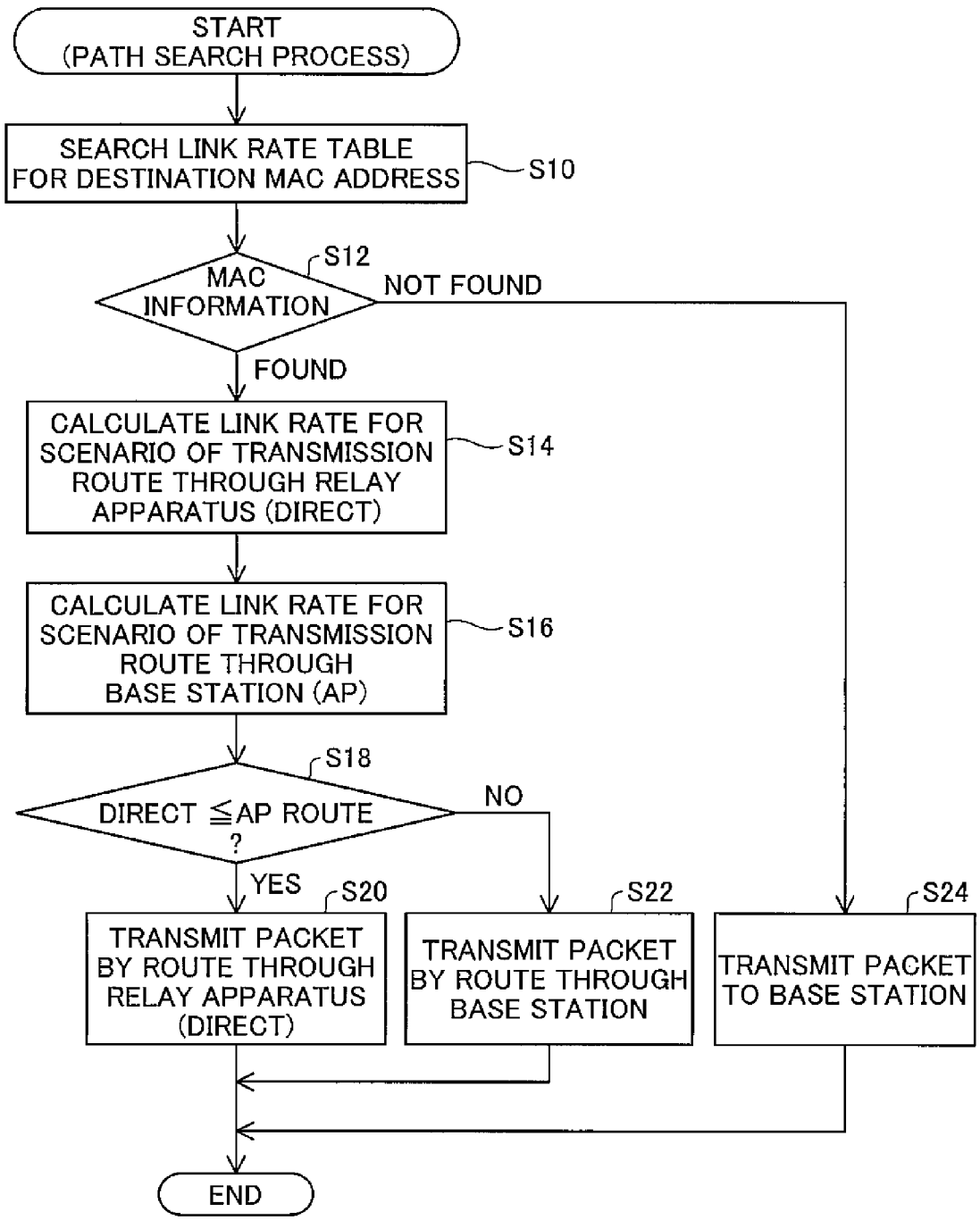
FIG. 10 is a flowchart depicting a processing routine of the path search module.

FIG. 10 is a flowchart depicting a processing routine of the path search module 218. Where, for example, data is to be sent from the terminal apparatus 21 that is connected to the relay apparatus 20, to the terminal apparatus 31 that is connected to the relay apparatus 30, the relay apparatus 20 can select at least the following two relay paths.

Path RT1: A direct relay path to the relay apparatus 30, without going through the base station 10 or another relay apparatus Path RT2: A relay path to the relay apparatus 30 via the base station 10

As discussed previously, from among the paths RT1 and RT2 the path search module 218 will select the path having the higher data transfer throughput.

In Step S10 of FIG. 10, the path search module 218 will search the MAC address list LTS field of the link rate table 224 to find the MAC address of the destination node (hereinafter also referred to as the "destination address"). If a destination address is not found, the path search module 218 will instruct the data transfer module 212 to send the packet to the base station 10 (Step S24). If a destination address is found, in Step S14, the link rate for a scenario of direct relay to the relay apparatus 30 without going through the base station 10 (that is path RT1) will be calculated. Next, in Step S16, the link rate for a scenario in which relay to the relay apparatus 30 takes place via the base station 10 (that is path RT2) will be calculated. In Step S18, the path search module 218 will then compare the link rates. In the event that relay to the relay apparatus 30 via the base station 10 (path RT2) is found to be faster, the path search module 218 will instruct the data transfer module 212 to send the packet via the base station 10 (Step S22). If this is not the case, the path search module 218 will instruct the data transfer module 212 to send the packet to the relay apparatus 30 without going through the base station 10 (Step S20). In preferred practice, in order to prevent a packet loop within the network 1000, the path search process will be carried out exclusively by a single relay apparatus (sender relay apparatus) on the wireless communications path. The path information calculated by the single relay apparatus can thus be stored in the frame. The storage location could be an IE (information element) of the IEEE 802.11 frame, for example. The second and subsequent apparatuses (for example the base station 10) on the wireless communications path can then refer to this header information when relaying the frame, thereby avoiding a loop situation.

Figure 11:
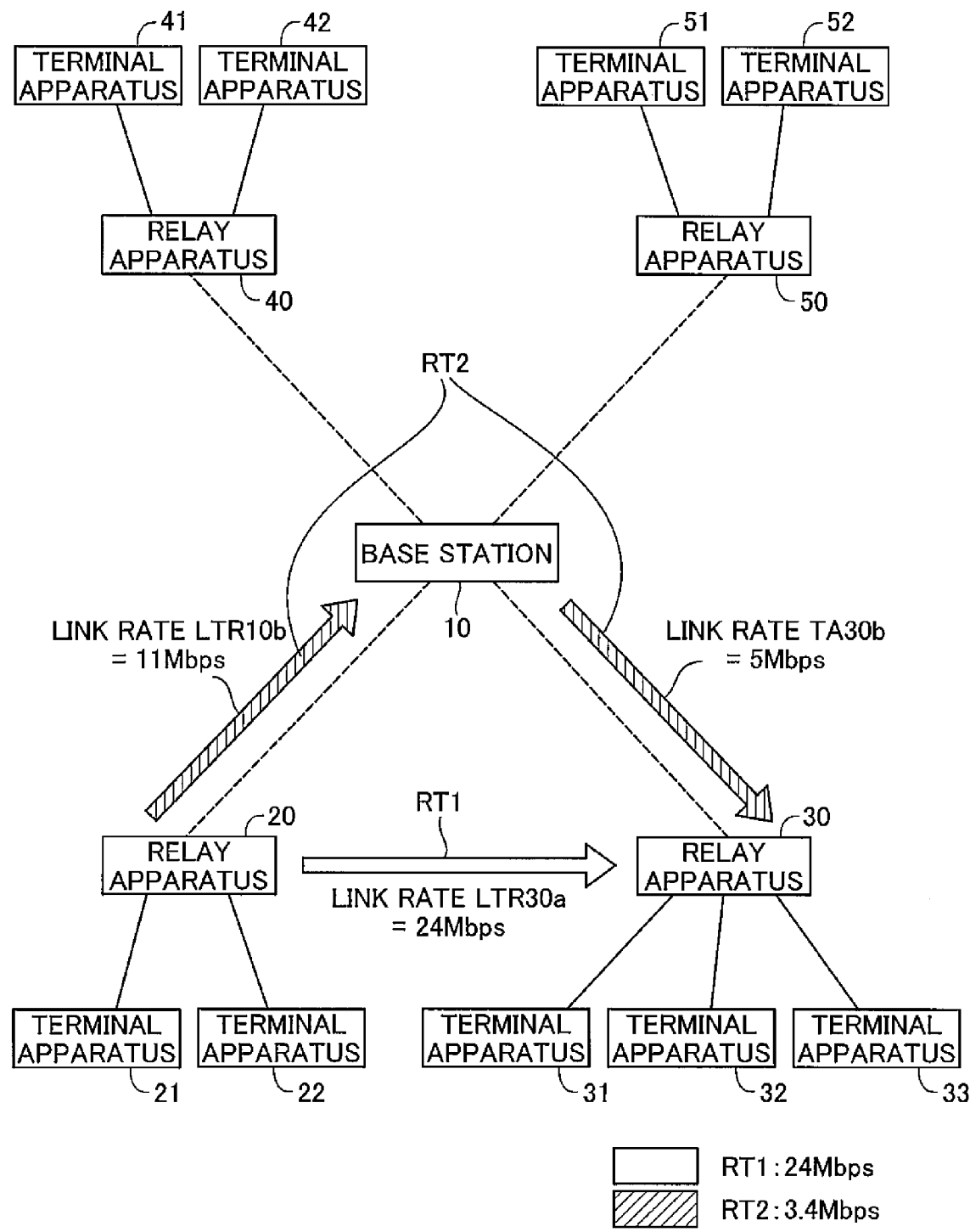
FIG. 11 is an illustration depicting a path setup method in Embodiment.

FIG. 11 is an illustration depicting a path setup method in Embodiment 1. The link rate of each path will be derived as follows. For simplicity, calculations are made in accordance with the following conditions.

Conditions: communication delays in respective devices are ignored, and UP/DOWN link rates are assumed to be the same. Overhead is not taken into consideration.

Path RT1 link rate: LTR30$a$=24 Mbps

LTR30$a$ is the value of the link rate LTR to relay apparatus 30 field in the link rate table 224.

Path RT2 link rate: $1/[(1/\text{LTR}10b)+(1/\text{LTA}30b)]=1/(1/11+1/5)=3.4$ Mbps LTR10$b$ is the link rate between the relay apparatus 20 and the base station 10. LTA30$b$ is the link rate between the base station 10 and the relay apparatus 30.

From these results, it can be seen that where data is to be sent from the terminal apparatus 21 connected to the relay apparatus 20, to the terminal apparatus 31 connected to the relay apparatus 30, higher throughput can be achieved by selecting the path RT1 of direct relay to the relay apparatus 30, without going through the base station 10. Because a data transfer path like path RT1 that does not go through a wireless LAN base station can be selected in this way, a greater number of alternative data transfer paths can be afforded. With regard to the plurality of data transfer paths, because a path with high data transfer throughput can be selected the time required for data transfer can be reduced. More efficient data communications will be possible as a result.

B. Second Embodiment

Figure 12:
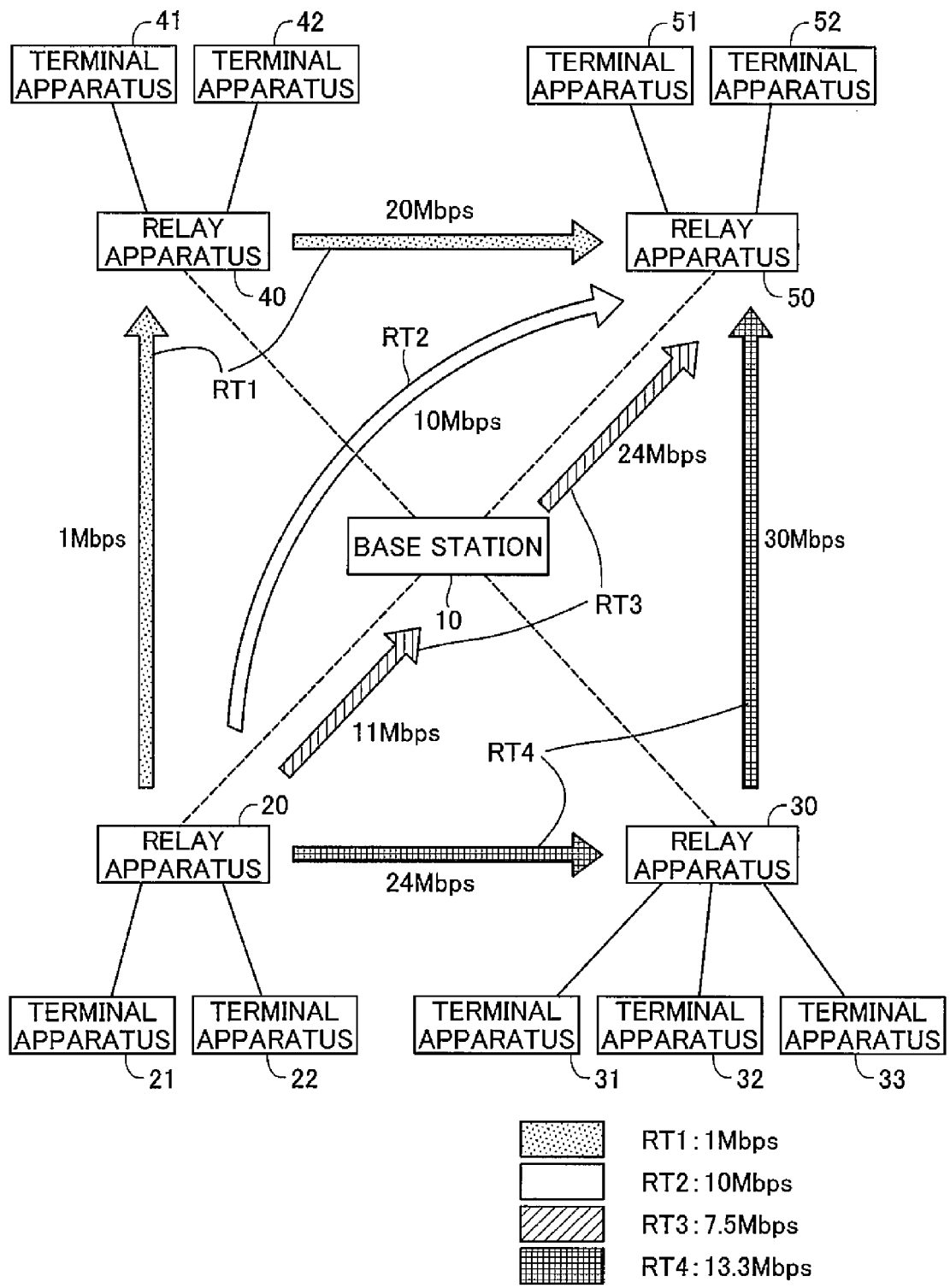
FIG. 12 is an illustration depicting a path setup method in Embodiment.

FIG. 12 is an illustration depicting a path setup method in Embodiment 2. The difference from Embodiment 1 shown in FIG. 11 is that during the path search, paths routed through other relay apparatuses are taken into consideration, in addition to paths routed through the base station; configuration and operation are otherwise the same as in Embodiment 1. The following description takes by way of example a case where data is to be sent from the terminal apparatus 21 that is connected to the relay apparatus 20, to the terminal apparatus 51 that is connected to the relay apparatus 50. In this case, the relay apparatus 20 can select at least the following four relay paths.

Path RT1: A relay path to the relay apparatus 50 via the relay apparatus 40

Path RT2: A direct relay path to the relay apparatus 50, without going through the base station 10 or another relay apparatus Path RT3: A relay path to the relay apparatus 50 via the base station 10

Path RT4: A relay path to the relay apparatus 50 via the relay apparatus 30

As discussed previously, from among the paths RT1 to RT4 the path search module 218 in Embodiment 2 will select the path having the highest data transfer throughput.

The link rates of the paths are as follows.
Path RT1 link rate: $1/(1/1+1/20)=1$ Mbps
Path RT2 link rate: 10 Mbps
Path RT3 link rate: $1/(1/11+1/24)=7.5$ Mbps
Path RT4 link rate: $1/(1/24+1/30)=13.3$ Mbps In preferred practice, for the purpose of calculating the above paths, the link rate table 224 (FIG. 9) will be provided with a field in which link rates to other relay apparatuses can be stored. A list for saving paths once they have been selected could also be provided. By so doing, if communication is to take place again between given relay apparatuses, the path for doing so can be selected from this list, without having to perform the path search described above. The volume of calculations associated with an increase in the number of relay apparatuses can be reduced thereby.

From these results, it can be seen that where data is to be sent from the terminal apparatus 21 connected to the relay apparatus 20 to the terminal apparatus 51 connected to the relay apparatus 50, higher throughput can be achieved by selecting the path RT4 of relay via the relay apparatus 30. In Embodiment 2, throughput will be calculated in this way in instances where data is relayed via other relay apparatuses, in addition to instances where data is relayed via the base station. Consequently, a more efficient relay path can be selected. Additionally, in the event that a network failure should occur on a certain path, it will be possible to search for another appropriate path which excludes the segment in question.

C. Third Embodiment

Figure 13:
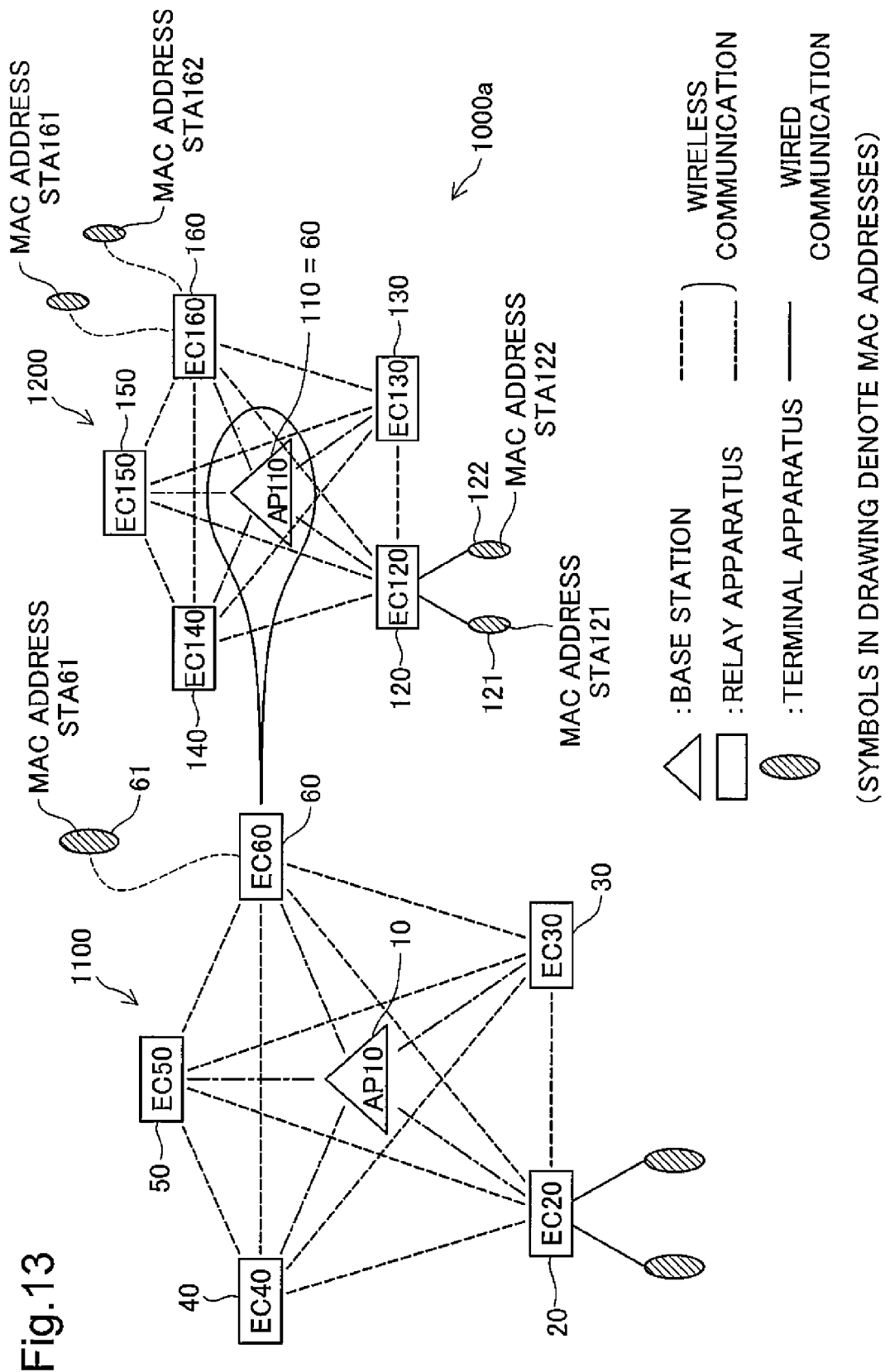
FIG. 13 is an illustration depicting a simplified configuration of a network in a third embodiment employing wireless LAN relay apparatuses.

FIG. 13 is an illustration depicting a simplified configuration of a network in a third embodiment employing wireless LAN relay apparatuses. The network 1000a in Embodiment 3 is a network that includes a network 1100 and a sub-network 1200. The network 1100 is composed of a base station 10, relay apparatuses 20 to 60, and terminal apparatuses. Except for being provided with the relay apparatus 60, the network 1100 is the same as the network 1000 (FIG. 1) of Embodiment 1. This relay apparatus 60 is termed a repeater, and is adapted to connect a terminal apparatus that connects via a wired connection, with a terminal apparatus that connects wirelessly. For a terminal apparatus that connects wirelessly (for example terminal apparatus 61), the only difference is the connection method (wired vs. wireless), and it is possible for such an apparatus to be handled in the same way as the terminal apparatuses in Embodiment 1. Other relay apparatuses can be connected to the relay apparatus 60. A relay apparatuses connected to this relay apparatus is also referred to as a "child relay apparatus".

The sub-network 1200 is composed of the relay apparatus 60, child relay apparatuses 120 to 160, and terminal apparatuses. In the sub-network 1200, the relay apparatus 60 functions as a base station 110. The child relay apparatuses 120 to 160 belong to the wireless LAN established by the base station 110. Infra mode communication is employed for communications among the base station 110 and the child terminal apparatuses. WDS mode communication is employed for communications among the child terminal apparatuses. It is also possible for terminal apparatuses to be connected to the child terminal apparatuses. The symbols (AP10, EC20 etc.) appearing in the apparatuses shown in FIG. 13 indicate the MAC addresses of the apparatuses.

FIG. 14 is an illustration depicting an example of the link rate table 224 in the relay apparatus 20 of Embodiment 3. This drawing corresponds to FIG. 9 of Embodiment 1. The only difference from Embodiment 1 depicted in FIG. 9 is that there is additional information for the relay apparatus 60; the configuration and operation are otherwise the same as in Embodiment 1. Field E101 in FIG. 14 indicates that the link rate from relay apparatus 20 to the relay apparatus 60 is 8 Mbps. Field E102 in FIG. 14 indicates that the link rate from relay apparatus 60 to base station 10 is 32 Mbps. Field E103 in FIG. 14 indicates that apparatuses having MAC addresses "STA61", "EC120", . . . etc. are connected to the relay apparatus 60.

As will be appreciated from this drawing as well, as seen from the standpoint of the relay apparatus 20, regardless of their type apparatuses located on the sub-network 1200 constituted by the relay apparatus 60 will be recognized as terminal apparatuses of the relay apparatus 60. This is similarly the case when seen from the standpoint of another base station or from another relay apparatus on the network 1100. Consequently, where data is to be relayed from the terminal apparatus 21 connected to the relay apparatus 20 to the terminal apparatus 121 connected to the relay apparatus 120, this will take place through the relay apparatus 60. That is, data communications from apparatuses on the network 1100 to apparatuses on the sub-network 1200 will take place through the relay apparatus 60. This is also true for data communications from apparatuses on the sub-network 1200 to apparatuses on the network 1100. The repeater can be situated at any location; it is also possible for an additional repeater to be situated on the sub-network 1200 to establish a sub-network of the sub-network 1200.

As in Embodiment 1, it will be possible using configurations such as these to achieve more efficient data communications. Also, in Embodiment 3, more flexible network management and operation are possible through the use of sub-networks. For example, a sub-network could be used to form a group among specific apparatuses, with hierarchical management of the group.

D. Modifications

While the present invention has been shown above through certain preferred embodiments, the invention is in no way limited to these embodiments and without departing from the spirit of the invention may be reduced to practice in various other modes, such as the following modifications for example.

D1. Modified Embodiment 1

In the preceding embodiments, link rate reports LR are transmitted among relay apparatuses; however, it would be possible to dispense with these link rate reports LR. As a specific example, it would be possible to employ an arrangement whereby a relay apparatus that transmits data will, each time that it does so, calculate the link rate for a plurality of paths, and then select a path. The link rate could be a NULL frame transmission link rate obtained, for example, when a NULL frame whose frame header contains path information for a path targeted for the calculation has been transmitted, and an ACK frame has been returned. A separate table adapted to store link rates for previously calculated paths may be provided as well. As another example, a link rate table could be input manually from a terminal apparatus.

D2. Modified Embodiment 2

In the preceding embodiments, the tables storing the group report GR and the link rate report LR are updated each time that these reports are received; however, it would be possible to dispense with this update process.

D3. Modified Embodiment 3

In the preceding embodiments, in order to simplify calculations, it was assumed that the UP and DOWN link rates are the same; however, path searches can be carried out in more reliable manner by differentiating between UP and DOWN link rates. In this case, a separate UP link rate and DOWN link rate would be stored in the link rate report and in the link rate table.

D4. Modified Embodiment 4

In the preceding embodiments, the same wireless channel is utilized for data communications between a terminal apparatus and the base station, and for data communications between terminal apparatuses; however, channels used for this purpose can be established arbitrarily. For example, different channels could be employed for data communications between a terminal apparatus and the base station, and for data communications between terminal apparatuses. By so doing, communications can take place even more efficiently, with no effect of the wireless LAN networks on each other.

D5. Modified Embodiment 5

In Embodiment 2, where data is to be relayed from a certain relay apparatus to another relay apparatus, only paths routed through no more than one additional apparatus therebetween are allowed; however, paths routed through multiple intervening apparatuses could be allowed as well. For example, to take the example in FIG. 12, paths such as the following could be considered as alternatives.

Path RT5: relay apparatus 20—relay apparatus 40—relay apparatus 30—relay apparatus 50 (via multiple relay apparatuses)

Path RT6: relay apparatus 20—relay apparatus 40—base station 10—relay apparatus 50 (via a relay apparatus and the base station)

What is claimed is:

1. A relay apparatus capable of relaying data transfer between a terminal apparatus and a wireless LAN base station through a wireless LAN, comprising:
   a wireless communication unit configured to carry out wireless communication with the base station, and capable of direct wireless communications respectively with other relay apparatuses belonging to the wireless LAN, without going through the base station;
   a notification unit configured to provide notification of a link rate report for the relay apparatus to the other relay apparatuses, wherein the link rate report includes:
      throughput of data transfer from the relay apparatus to the other relay apparatuses, which is measured by the relay apparatus;
      throughput of data transfer from the relay apparatus to the base station which is measured by the relay apparatus; and
      the MAC addresses of the terminal apparatuses;
   a link rate table storing unit configured to store a link rate table containing contents of the link rate reports received from the other relay apparatuses;
   a table update unit configured to update the link rate table each time that the link rate report is received; and
   a path search unit configured to search the link rate table and compare the throughput of a wireless communication path for carrying out data transfer to a destination apparatus without going through the base station, with the throughput of a wireless communication path for carrying out data transfer to a destination apparatus going through the base station; and select the path having higher throughput.

2. The relay apparatus according to claim 1, wherein the table update unit, upon being triggered by a elapse of prescribed time interval without receipt of a link rate report from the other relay apparatus, will update the link rate table to a state in which wireless communication paths that are routed through the other relay apparatus are deselected.

3. The relay apparatus according to claim 1, wherein the notification unit, periodically provides notification of the link rate report to the other relay apparatuses.

4. A method of relaying that employs a relay apparatus capable of relaying data transfer between a terminal apparatus and a wireless LAN base station, and capable of direct wireless communications respectively with other relay apparatuses belonging to the wireless LAN, without going through the base station; the method comprising the steps of:
   providing notification of a link rate report for the relay apparatus to the other relay apparatuses, wherein the link rate report includes:
      throughput of data transfer from the relay apparatus to the other relay apparatuses, which is measured by the relay apparatus;
      throughput of data transfer from the relay apparatus to the base station which is measured by the relay apparatus; and
      the MAC addresses of the terminal apparatuses;
   storing a link rate table containing contents of the link rate reports received from the other relay apparatuses;
   updating the link rate table each time that the link rate report is received; and
   comparing, based on the link rate table, the throughput of a wireless communication path for carrying out data transfer to a destination apparatus without going through the base station, with the throughput of a wireless communication path for carrying out data transfer to a destination apparatus going through the base station; and selecting the path having higher throughput.

5. A computer program product for relaying data transfer between a terminal apparatus and a wireless LAN base station, comprising a non-transitory computer-readable storage medium having computer-readable program code embodied in the medium, the computer-readable program code comprising:
   a wireless communication code for carrying out wireless communication with the base station, and capable of direct wireless communications respectively with other relay apparatuses belonging to the wireless LAN, without going through the base station;

a notification code to provide notification of a link rate report for the relay apparatus to the other relay apparatuses, wherein the link rate report includes:
  throughput of data transfer from the relay apparatus to the other relay apparatuses, which is measured by the relay apparatus;
  throughput of data transfer from the relay apparatus to the base station which is measured by the relay apparatus; and
  the MAC addresses of the terminal apparatuses;

a link rate table storing code to store a link rate table containing contents of the link rate reports received from the other relay apparatuses;

a table update code to update the link rate table each time that the link rate report is received; and a path search code for comparing, based on the link rate table, the throughput of a wireless communication path for carrying out data transfer to a destination apparatus without going through the base station, with the throughput of a wireless communication path for carrying out data transfer to a destination apparatus going through the base station; and selecting the path having higher throughput.

* * * * *